(12) United States Patent
Giessibl (10) Patent No.: US 11,137,313 B2
(45) Date of Patent: Oct. 5, 2021

(54) TORQUE SENSOR COMPONENT PAIRING AND ASSEMBLY

(71) Applicant: METHODE ELECTRONIC, INC., Chicago, IL (US)

(72) Inventor: Johannes Giessibl, Amerang (DE)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 16/805,096

(22) Filed: Feb. 28, 2020

(65) Prior Publication Data

US 2020/0200637 A1 Jun. 25, 2020

Related U.S. Application Data

(62) Division of application No. 15/617,681, filed on Jun. 8, 2017, now Pat. No. 10,634,573.

(60) Provisional application No. 62/347,407, filed on Jun. 8, 2016.

(51) Int. Cl.
*G01L 25/00* (2006.01)
*G01L 3/10* (2006.01)

(52) U.S. Cl.
CPC ............ *G01L 25/003* (2013.01); *G01L 3/102* (2013.01); *G01L 3/105* (2013.01)

(58) Field of Classification Search
CPC ............................. G01L 25/003; G01L 3/102
See application file for complete search history.

(56) References Cited

U.S. PATENT DOCUMENTS

| | | | |
|---|---|---|---|
| 5,351,555 A | 10/1994 | Garshelis |
| 5,520,059 A | 5/1996 | Garshelis |
| 6,047,605 A | 4/2000 | Garshelis |
| 6,260,423 B1 | 7/2001 | Garshelis |
| 6,389,910 B1 | 5/2002 | Eisenhauer |
| 8,087,304 B2 | 1/2012 | Lee |

(Continued)

FOREIGN PATENT DOCUMENTS

WO    WO-2015/082835 A1    6/2015

OTHER PUBLICATIONS

Supplemental European Search Report for Appl. No. 17810996.3 dated Jan. 13, 2020.

(Continued)

*Primary Examiner* — Clayton E. LaBalle
*Assistant Examiner* — Dennis Hancock
(74) *Attorney, Agent, or Firm* — Blank Rome LLP (57) ABSTRACT

A system and method are provided related to replacing components of a fully assembled torque sensor system having been previously calibrated, whereby the new system with its new components, which may be installed in a larger system, can be recalibrated at the location where the component replacement or servicing occurs. Individual components are provided with individual characteristics information, either on or associated with the shipped component, so the end user may retrieve the information and enter it in the software, such as that associated with a control unit, which is used with the fully assembled torque sensor. A database storing information about each manufactured component and their respective characteristics information, and fully assembled systems and their collective characteristics information, may be maintained and accessible by end users.

8 Claims, 7 Drawing Sheets

(56) References Cited

U.S. PATENT DOCUMENTS

| | | |
|---|---|---|
| 8,635,917 B2 | 1/2014 | Lee |
| 8,836,458 B2 | 9/2014 | Lee |
| 8,991,267 B1 | 3/2015 | Kenney et al. |
| 2004/0264581 A1 | 12/2004 | Perry |
| 2005/0005714 A1 | 1/2005 | Koga et al. |
| 2005/0172732 A1 | 8/2005 | Feng |
| 2007/0038401 A1 | 2/2007 | Cripe |
| 2007/0089539 A1 | 4/2007 | Hedayat et al. |
| 2007/0113683 A1 | 5/2007 | Hedayat et al. |
| 2013/0125669 A1* | 5/2013 | Barraco .................. G01L 3/102 73/862.333 |
| 2016/0069768 A1 | 3/2016 | Johansson |
| 2016/0123821 A1 | 5/2016 | Jolly |
| 2016/0252415 A1 | 9/2016 | Lu |
| 2016/0339992 A1* | 11/2016 | Yoshiie ................... B62M 6/55 |

OTHER PUBLICATIONS

Office Action dated Nov. 17, 2020 from corresponding EP Patent Application No. 17 810 996.3.

* cited by examiner

TORQUE SENSOR COMPONENT PAIRING AND ASSEMBLY

CROSS-REFERENCE TO RELATED APPLICATIONS

This is a divisional application that is based on and claims the benefit of the filing date and disclosure of U.S. application Ser. No. 15/617,681, entitled "Torque Sensor Component Pairing and Assembly," which was filed on Jun. 8, 2017, and which is related to and claims the benefit of the filing date of U.S. Provisional Application No. 62/347,407, entitled "Torque Sensor Component Pairing and Assembly," which was filed on Jun. 8, 2016. The contents and disclosure of the same are incorporated herein by reference.

BACKGROUND OF THE INVENTION

Field of Invention

The present invention relates to manufacturing torque sensor devices and systems that incorporate torque sensor technology, and methods for assembling torque sensor components into an end product, which may be a subsystem integrated into a larger system.

Description of Related Art

An assembled torque sensor system may be described by reference to three basic components: a shaft or disk having one or more integral magnetically-conditioned regions, non-contact magnetic field sensors positioned in proximity to the magnetically-conditioned regions, and associated electronics components that in combination output an electrical signal containing information representative of a measurable state of the shaft or disk upon the application of a torque. Torque sensor systems of this type are available from, for example, Methode Electronics, Inc., of Chicago, Ill., and are described in various patents, including, but not limited to, U.S. Pat. Nos. 6,260,423, 8,087,304, and 8,836,458, the contents and disclosures of which are incorporated herein by reference in their entirety.

Figure 1A:
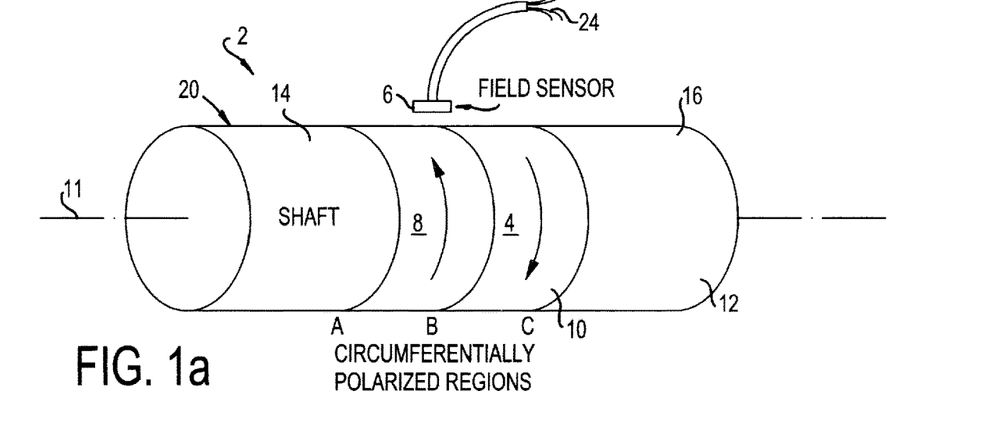
FIG. 1(a) is a schematic perspective view of a prior art shaft-type torque sensor system component.

Referring to FIG. 1(a) from U.S. Pat. No. 6,260,423, shown therein is a shaft-type torque sensor device 2, which includes a transducer 4 and a magnetic field vector sensor 6. The transducer 4 includes one or more axially distinct, magnetically contiguous, oppositely polarized, circumferential bands or regions 8, 10 solely defining the magnetically active or transducer region of the shaft 12. The region 14 of the shaft to the left of A and the region 16 to the right of B are distinguishable from the active region only by the absence of any significant remanent magnetization. The shaft 12 is typically formed of a ferromagnetic, magnetostrictive material having a particularly desirable crystalline structure such that the active region will, likewise, be formed of ferromagnetic, magnetostrictive material having the desired crystalline structure. A torque 20 is shown being applied at one portion of the shaft 12 and is transmitted thereby to another portions of the shaft 12 where the motion of the shaft 12 due to the torque 20 performs some useful work. The torque 20 is shown as being in a clockwise direction looking at the visible end of the shaft 12, but obviously can be applied to rotate or tend to rotate the shaft in either or both directions depending on the nature of the machine incorporating the shaft 12.

The transducer 4 is magnetically polarized in a substantially purely circumferential direction, as taught in U.S. Pat. Nos. 5,351,555 and 5,520,059, the contents and disclosures of which are incorporated herein by reference, at least to the extent that, in the absence of the torque 20 (in a quiescent state), it has no net magnetization component in the direction of axis 11 and has no net radial magnetization components. The closed cylindrical shape of the transducer 4 enhances the stability of the polarization by providing a complete magnetic circuit.

The magnetic field vector sensor 6 is a magnetic field vector sensing device located and oriented relative to the transducer 4 so as to sense the magnitude and polarity of the field arising in the space about the transducer 4 as a result of the reorientation of the polarized magnetization from the quiescent circumferential direction to a more or less steep helical direction upon application of the torque 20. The magnetic field vector sensor 6 provides a signal output reflecting the magnitude of the torque 20. The magnetic field vector sensor 6 may be an integrated circuit Hall effect sensor. The wires 24 connect magnetic field vector sensor 6 to a source of electrical current, and transmit the signal output of the magnetic field vector sensor 6 to a receiving device (not shown), such as a control or monitoring circuit for the machine or system incorporating the shaft 12. A more detailed discussion of the types, characteristics, positioning and functioning of magnetic field vector sensors appears in at least the aforementioned U.S. Pat. Nos. 5,351,555 and 5,520,059; as well as in at least the aforementioned U.S. Pat. No. 8,087,304.

The two circumferentially polarized regions 8, 10 together constitute the transducer's active region 4. The field sensor shown is centered on the "wall" between the two oppositely polarized regions and is oriented to sense the radial field at this location. One or more magnetic field sensors may be utilized. In general, each such sensor would be located near the active region and oriented such that it is maximally efficient at sensing the field that arises when the shaft is transmitting torque. The similarity between this transducer and the more conventional design of U.S. Pat. Nos. 5,351,555 and 5,520,059 employing an active region endowed with uniaxial circumferential anisotropy ("ring sensor") is obvious.

Figure 1B:
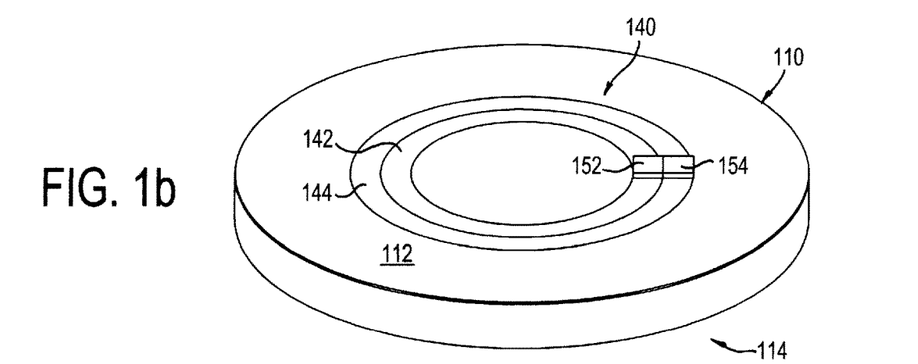
FIG. 1(b) is a schematic perspective view of a prior art disk-type torque sensor system component.

Referring to FIG. 1(b) from U.S. Pat. No. 8,836,458, shown therein is a perspective drawing of a generally disk-shaped torque sensor device. The disk 110 is formed of ferromagnetic material and is, or at least includes, a magnetoelastically active region 140. The material selected for forming the disk 110 must be at least ferromagnetic to ensure the existence of magnetic domains for at least forming a remanent magnetization in the magnetoelastically active region 140, and must be magnetostrictive such that the orientation of magnetic field lines in the magnetoelastically active region 140 may be altered by the stresses associated with applied torque. The disk 110 may be completely solid, or may be partially hollow. The disk 110 may be formed of a homogeneous material or may be formed of a mixture of materials. The disk 110 may be of any thickness, and is preferably between about 3 mm and about 1 cm thick.

The magnetoelastically active region 140 is preferably flat, and comprises at least two radially distinct, annular, oppositely polarized magnetically conditioned regions 142, 144, defining the magnetoelastically active region 140 of the torque sensing device. The top and bottom surfaces 112, 114 do not have to be flat, however, as shown, but could have variable thickness in cross-section from the center of the disk 110 to the outer edge. Depending on the application for which the torque sensing device is desired, it may be impractical to position magnetic field sensors 152, 154 on both sides of the disk 110. Therefore, the magnetoelastically active region 140 may be present on only one surface of the disk 110. However, the magnetoelastically active region 140 may also be present on both sides of the disk 110. One or more magnetic field vector sensors may be positioned in proximity to the magnetically conditioned regions.

During operation of an exemplary torque sensor system of the kind identified above and described below, a flux-gate magnetometer is used to detect an applied magnetic field by utilizing the saturation-characteristics of a ferromagnetic material in a magnetic field. An inductor possessing a core of ferromagnetic material will exhibit very non-linear changes to its inductance if this core is allowed to saturate. By detecting the presence of this non-linear behavior, the magnetic field applied to the inductor can be inferred.

If one assumes use of an inductor with a core of ferromagnetic material, this inductor can be driven with a triangular alternating current waveform. The voltage waveform across the inductor will be approximately a square wave, with an amplitude equal to $L*dI/dt$, where L is the inductance of the inductor, and $dI/dt$ is the time rate-of-change of the applied current waveform. As the inductor core saturates due to the magnetic flux within it resulting from the applied current waveform, the inductance of the inductor will drop dramatically. At this time, the voltage waveform across the inductor will drop toward zero also.

If an ambient magnetic field exists, it will create a flux within the inductor core which will be additive with that applied by the excitation current waveform. The result will be that the inductor will saturate at a different amplitude of excitation current between one polarity and another. This will cause a distortion of the voltage waveform across the inductor containing a second harmonic term. By detecting the phase and amplitude of this second-harmonic component, the amplitude and direction of the ambient magnetic field can be determined.

In driving the flux-gates, it is generally intended that the flux-gates spend time saturated in both directions so that the core does not build up a magnetic offset. To achieve this, it is generally desired to use a clock source that feeds into a D-flip flop with both an output and inverted output. Going into a D-flip flop serves two purposes. One, it divides the clock in half and two it provides a differential clock signal. The differential clock signal can be fed into a pair of line drivers to drive the flux-gates. One line driver is connected to one side on the flux-gates and the other line driver is connected to the other side of the flux-gates. Driving the flux-gates in this manner means that for half the clock cycle the core is going into magnetic saturation in one direction. For the other half of the clock cycle the core is going into magnetic saturation in the other direction.

Typically, a clock source may consist of an inverter with a Schmitt trigger input, a resistor and capacitor from the output to the input to control the frequency of the clock signal. The clock signal can also be provided by a microcontroller. The clock frequency and voltage can be set so that the flux-gates go far enough into saturation that the ambient magnetic field does not prevent the flux-gates from achieving saturation.

Generally, the fluxgates along with two resistors can be arranged in a bridge configuration, which requires a minimum of two fluxgates to operate the circuit. The centers of the fluxgates and the resistor are feed into a pair of analog switches. This acts as a balanced demodulator, operated at twice the coil excitation frequency, so that the output of these switches is a differential current whose amplitude and polarity is proportional to the amplitude and phase of the second harmonic content of the flux-gate voltage waveform. This current signal can be integrated by an op-amp. The op-amp can produce an error signal that can be fed back through a resistor into the center point between the flux-gates. This closes the loop and keeps the system in control. The value of the feedback resistor can be used to control the response of the circuit to ambient magnetic fields. The higher the resistor, the larger the voltage response at the output of the integrator is to an ambient magnetic field.

An error signal can be fed into a second-order multi-feedback low pass filter with adjustment for both swing and mean value. The adjustments for the swing and mean value can be done using a digital potentiometer. With the gain potentiometer centered, the cutoff frequency can be 2.4 kHz.

A monitor can be used to detect signals when the drive signal appears on the center tap between the flux-gates. The reason for a drive signal on the center tap, has to due with an open in a flux-gate. The center tap between the flux-gates is connected to an op-amp with diode, resistors, and capacitor make up a peak detect circuit. In normal operating conditions, the value of the monitor can be a diode drop below the center tap voltage.

Generally, the electronics and the shaft/disk components of a torque sensor system like those identified above and their variants are manufactured as a completed set in order to guarantee calibration. The completed set ordinarily requires, as a final extra manufacturing step at the point of manufacturing, calibration of the system. This can hinder post-manufacturing component servicing or replacement where part of the previously-calibrated set is altered or replaced with a new component that has a different operating characteristic than the original part, thereby potentially making the original calibration inapplicable to the new set. It is, therefore, desirable to employ a torque sensor system that addresses the issues experienced when an altered or replaced component is added to an existing system, where that component has a different operating characteristic than the original part.

SUMMARY AND OBJECTS OF THE INVENTION

In the present invention, a shaft (or disk) like those mentioned above, having integrated magnetized portions, such as magnetoelastic sensing features, is used to transmit an applied torque. Magnetic field sensors like those mentioned above are used to sense a magnetic flux emanating from the magnetized portions. Electronics like those mentioned above are used to receive, process, and output a signal representative of the applied torque. Torque sensor systems of this type are usually calibrated as completed sets, which include all sensor components and connecting cables that carry electronic signals between components.

A torque sensor system may be a combination of a shaft plus a sensor with integrated electronics (i.e., two components), or it may be a combination of a shaft plus a sensor plus electronics (i.e., three components). In the former case, the two components each have individual calibrations; in the latter case, the three components each have individual calibrations. In each combination, the components may be produced and calibrated at independent locations, then undergo a pairing procedure whereby each component's characteristics have previously been identified, recorded, and are thereafter traceable so that a final system calibration will not be necessary after the components are paired together. This reduces the effort needed by the organization that performs the final assembly, and allows for interchangeable components, which is advantageous in the case of servicing (e.g., replacing) components.

To accomplish the pairing of a shaft (or a disk) component and magnetic sensing components, each component (and their respective parts, as necessary) may be marked, tagged, or otherwise indicated with a barcode, RFID chip, DMC, or other device, or indicated with a marking/tagging method, each having calibration parametric data (primarily sensitivity and offset) for that component.

Alternatively, the characteristics information for each component may be in the form of a unique number that allows identifying the component characteristics stored in a database by cross-referencing the unique number with the database records.

Either way, once components are combined in a final system, the individual characteristics may be used by the system electronics software to correct for the deviation of the individual components from their targeted nominal values. For example, in the case of sensitivity and offset, correction factors (multiplication or division, for sensitivity, and addition or subtraction, for offset), may be applied by the software. If the sensor electronics fail, one could know which sensor (coils) and shaft are assembled in the customer system by referencing the characteristics information.

By way of a specific, non-limiting example, an automotive transmission may incorporate, or include, a torque sensor system having three general components: a shaft (or disk), magnetic field sensors (usually fluxgate coils), and electronics. If the electronics are provided with software, the software could perform various processes, such as (1) driving the fluxgate coils, (2) quantifying the magnetic field, and (3) providing calibration parameters that "pair" the field sensors (with associated electronics) with the shaft. In that torque sensor system, both the shafts (disks) and the field sensor arrays may each have variations in certain operating parameters due to manufacturing tolerances, heat treatment, etc. There may also be variation in the electronics, and thus correction in most cases needs to happen at the system level from the customer, taking all three varying components into consideration.

To account for variations, assemblies sold as complete products (completely or partially assembled) are manufactured in a way that one of the final steps is to apply a known torque value or range of values to the completed assembly, and then make a "zero" or offset adjustment and a gain, or slope adjustment to the interface electronics. In some instances, however, this approach may not be feasible, such as in the case of automotive powertrain applications (for reasons known to those skilled in the art), and other automotive and non-automotive systems where components may need to be manufactured separately and combined together later in the final product. Thus, for each component, the manufacturer may identify and record properties of each component of an assembly in a way that the information is then available when assembling the components into a final system.

In one aspect of the invention, the properties of the assembled system are characterized to obtain the necessary offsets, which may be used to compute adjustment factors for use in adjusting the system output signal(s).

As another option, the shaft (or the disk) properties may be measured by the shaft (disk) manufacturer and recorded on a bar code, RFID chip, or other recording device that is associated with the shaft (disk), such as by hanging or fixing a tag or etching, etc., the bar code, RFID chip, or other recording device, or index number for cross-referencing records in a database, in or on the shaft (disk).

Similarly, the field sensor assembly properties may be measured by the field sensor assembly manufacturer and recorded on a different bar code, RFID chip, or other recording device that is associated with the field sensor assembly.

When those components—the shaft or the disk with the field sensor assembly—are paired together later, the property values thus recorded are input into the sensor/interface electronics during a final pairing process at the assembly location, either manually or automatically, i.e., by scanning a bar code or interrogating RFID chips to obtain the information. In that way, any manufactured shaft (with its previously recorded properties) may be paired to any manufactured sensor array (with its previously recorded properties) and may be paired to any manufactured sensor electronics (with its previously recorded properties).

In yet another aspect of the present invention, an algorithm of the software may automatically calibrate the electronics or system level electronics control unit (ECU) without the organization responsible for combining the components having to apply torque to the shaft (disk) to obtain the operating parameters of the final assembly.

In another aspect of the invention, the final calibration parameters are offset and gain; however, other properties can also affect accuracy (e.g., hysteresis, rotational signal error (RSU), compassing, near field interference, rotational signal, and temperature (temperature compensation, Tcomp, etc.), some of which are inherent properties, and are accounted for in the algorithm. Combined components may also have unique characteristics, such as temperature compensation, and, therefore, identifying characteristics of individual and combined components are envisioned as part of the invention.

The present invention is useful in, for example, the automotive assembly industry in which a torque sensor system, which are made up of multiple components, is employed in a vehicle or vehicle product such as a gearbox.

DETAILED DESCRIPTION OF THE PREFERRED EMBODIMENT

Several preferred embodiments of the invention are described for illustrative purposes, it being understood that the invention may be embodied in other forms not specifically described below and/or shown in the drawings.

Figure 2:
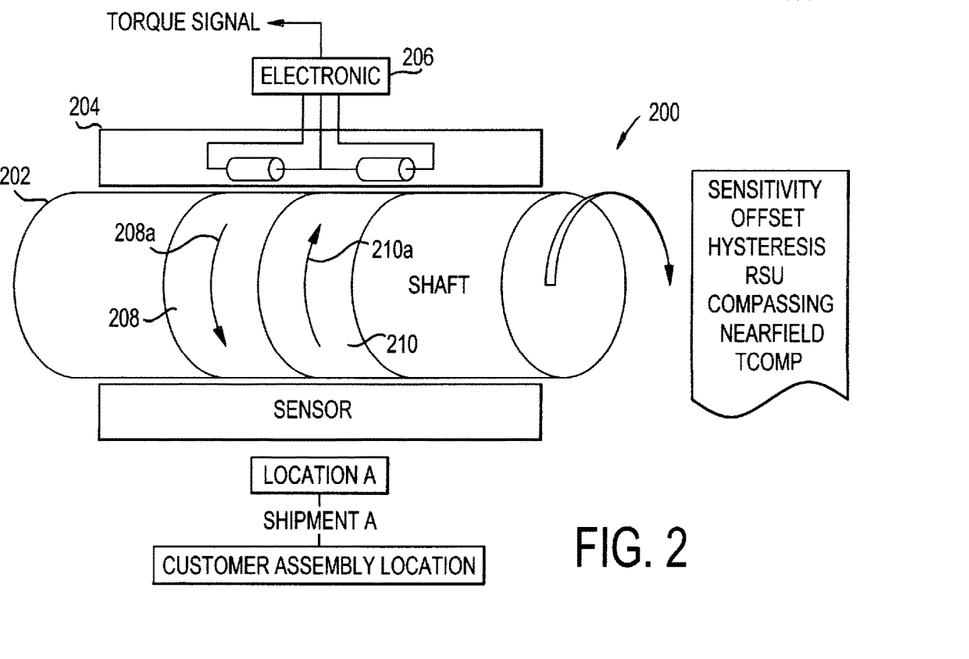
FIG. 2 is a schematic partial cross-sectional diagram of an assembled torque sensor system, showing a shaft, magnetic field sensors, and electronics components according to one aspect of the present invention.

Turning first to FIG. 2, shown therein is a schematic partial cross-sectional diagram of an assembled torque sensor system 200, showing a shaft 202, non-contact magnetic field sensors 204 in proximity to the shaft 202, and electronics components 206 according to one aspect of the present invention.

In the embodiment shown, the assembled torque sensor system 200 may be manufactured at a single location (i.e., "Location A"). The torque sensor system 200 may be shipped from "Location A" to the customer's assembly location.

The shaft 202 may be rotatable or stationary. It has one or more (preferably two or three) magnetoelastic magnetized portions shown as features 208, 210, which are axially-extending axial portions of the shaft 202. Each feature 208, 210 may be circumferentially magnetized such that the magnetization in each portion is substantially circumferential in the direction shown (i.e., as indicated by the arrows 208a, 210a).

One skilled in the art will appreciate that the shaft 202 may instead be a disk. The disk, like the shaft 202, may be rotatable or stationary.

A magnetized shaft (disk) 202, magnetic field sensors 204, and electronics 206 components suitable for the present invention are available from Methode Electronics, in Chicago, Ill., USA, and are generally disclosed in one of several Methode patents, including, but not limited to, those identified and described above such as U.S. Pat. Nos. 6,047,605, 8,087,304, and 8,635,917, the contents and disclosures of which are incorporated herein by reference.

The shaft 202, magnetized as described above, and the magnetic field sensors 204 collectively exhibit or inherently possess certain magnetic and magnetic field characteristics, including sensitivity, offset, hysteresis, rotational signal error (RSU), compassing, changes thereto due to near field interference, and changes thereto due to temperature and other environmental or operating conditions. Definitions and/or descriptions of each of those characteristics and/or parameters are provided above and in the above-cited references and are well-known to those skilled in the art. Those characteristics may be identified through testing and/or experimentation and thereafter associated with that unique pairing of torque sensor system components.

In FIG. 2, the "Location A" may be a physical location, such as a manufacturing facility.

Figure 3:
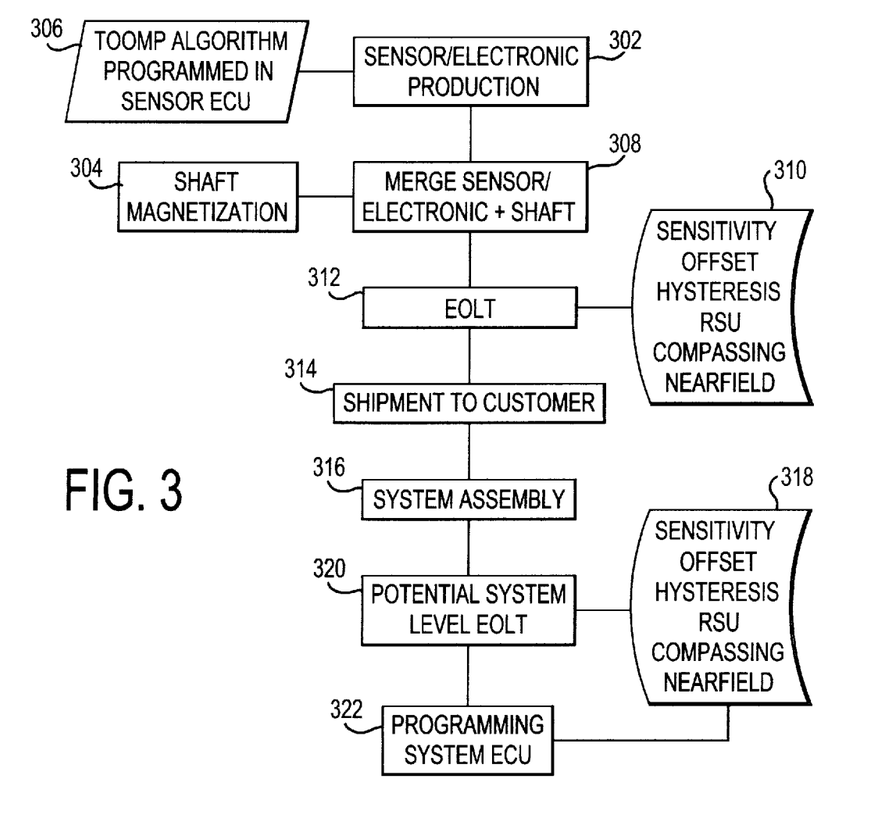
FIG. 3 is a block flow diagram summarizing a method for making the assembled torque sensor system of FIG. 2.

Turning now to FIG. 3, shown therein is a block flow diagram summarizing a method for making the assembled torque sensor system 200 of FIG. 1. In the method depicted therein, in which assembly into its final, completely-assembled form for later integration into a final product (such as an automobile) is performed at a single location, step 302 involves production of the magnetic field sensors 204 and the electronics components 206.

Step 304 involves magnetization of the shaft 202 as described and referenced above.

Step 306, which is optional if digital electronics are available, involves loading a temperature compensation (Tcomp) algorithm into an ECU of the magnetic field sensors 204.

Step 308 involves merging (e.g., through the various processes of positioning, arranging, orienting, connecting, fastening, assembling, attaching, etc.) the shaft 202 and magnetic field sensors and electronics 204 into a final assembled product.

Step 310 involves storing or retrieving from storage characteristics information or data concerning the final assembled product regarding its sensitivity, offset hysteresis, RSU, compassing, and near field interference, and/or other parameters.

Step 312 involves providing the characteristics information to, or determining initial or updated characteristics information of the final assembled product at or by, the end of line tester (EOLT). In this step, the information and data for step 310 is/are created.

Step 314 involves shipping or providing the final assembled product along with the characteristics information determined at or by the EOLT.

Step 316 involves incorporating the final assembled product into another system, such as an automotive transmission.

Step 318 involves storing or retrieving from storage characteristics information or data concerning the final assembled product regarding its sensitivity, offset hysteresis, RSU, compassing, and near field interference, and/or other parameters. The customer creates the same data again.

Step 320 involves providing the characteristics information to or determining initial or updated characteristics information of the full system at or by the EOLT of the customer.

Step 322 involves programming or updating the programming of the electronic control unit that is used to control the full system (e.g., transmission ECU).

Figure 4:
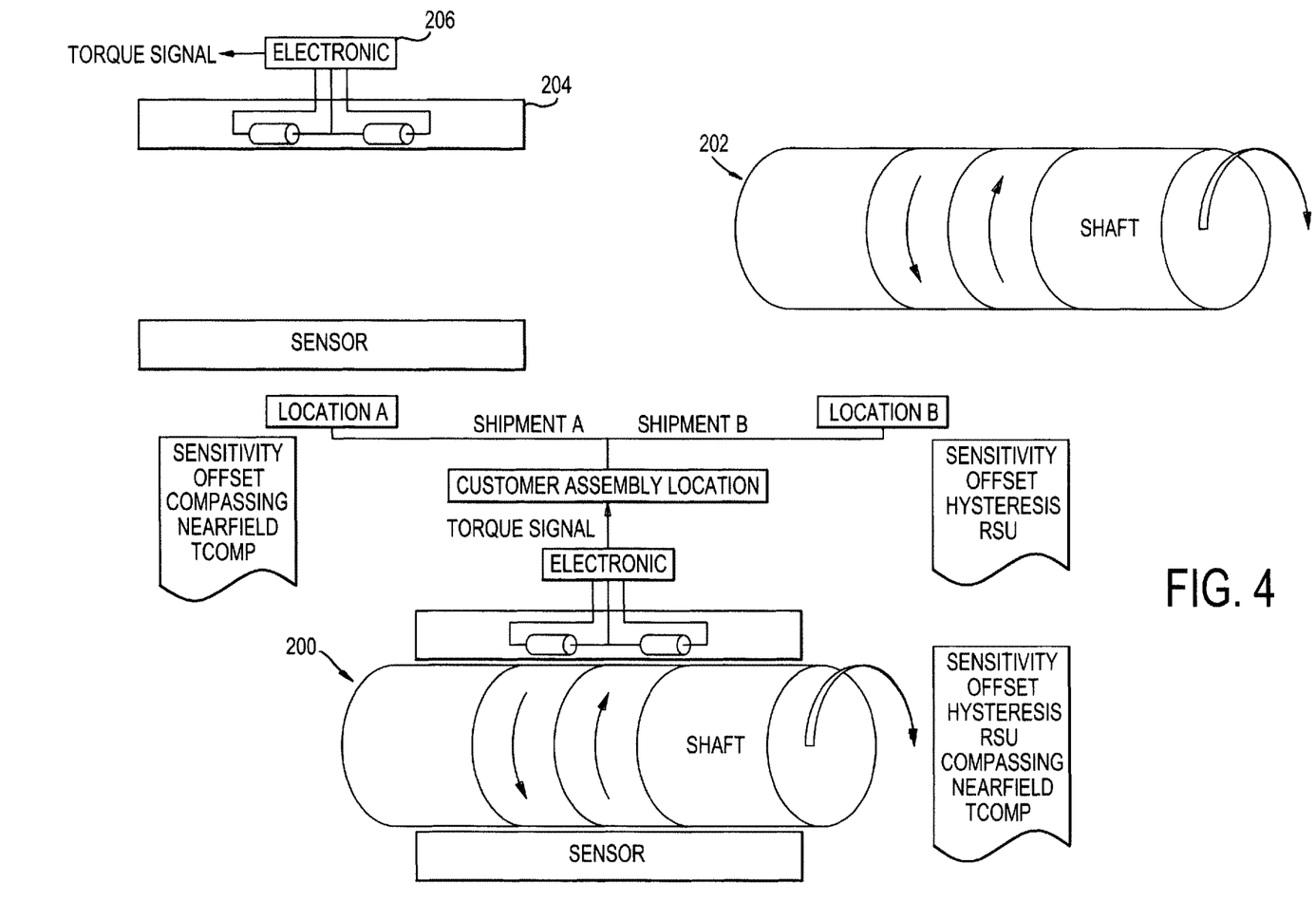
FIG. 4 is a schematic partial cross-sectional diagram of the individual components of and a final assembled torque sensor system, showing a shaft, magnetic field sensors, and electronics components according to another aspect of the present invention.

Turning now to FIG. 4, shown therein is a schematic partial cross-sectional diagram of the individual components of and a final assembled torque sensor system 200, showing a shaft 202, one or more magnetic field sensors 204, and electronics component 206 according to another aspect of the present invention. The magnetic field sensors 204, and the electronics components 206, which possess certain characteristics (as shown and described above), may be manufactured at a first location (i.e., "Location A") and then shipped to a customer assembly location (i.e., "Shipment A"). The shaft 202 component may be manufactured at a second location (i.e., "Location B") and then shipped to the customer assembly location (i.e., "Shipment B"). The two shipments are then merged together at the customer assembly location (e.g., through the various processes of positioning, arranging, orienting, connecting, fastening, assembling, attaching, etc., the shipped components).

In FIG. 4, the "Location A" and the "Location B" could each be, for example, a different physical location, such as different manufacturing facilities owned by different entities in different states or countries. Or, the "Location A" and the "Location B" could each be a different manufacturing facility owned by the same entity but located at a different physical location, such as in different states or countries. Or, the "Location A" and the "Location B" could each be different manufacturing lines at a particular physical address owned by a single entity. The two locations where the torque sensor system components are made are not to be considered as being limited to any particular physical distance separating where they are made, or who or what owns or controls the property at the locations where the components are separately made.

As one non-limiting example of the above, an assembly location might be an automobile dealership service shop where automobiles are serviced (i.e., repaired, maintained, inspected, etc.). Automobiles equipped with assembled torque sensor systems could be repaired or otherwise serviced at the service shop. The dealership's parts department might carry in stock or provide to the service shop one or more replacement magnetic field sensors 204, replacement electronics components 206, and replacement shaft 202 components, each of which may have been manufactured at different locations and shipped to the dealership.

Figure 5:
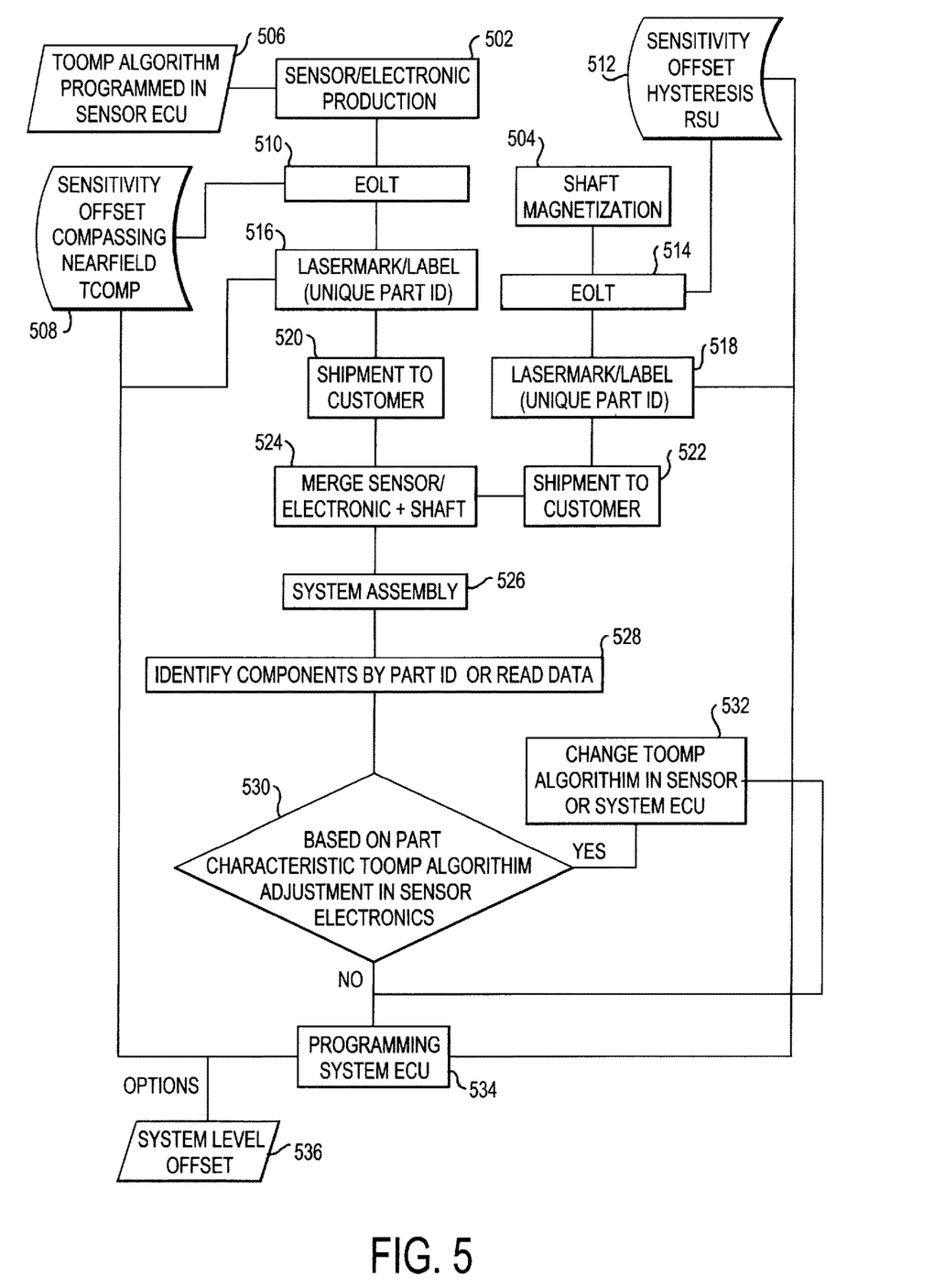
FIG. 5 is a block flow diagram summarizing a method for making the components and final assembled torque sensor system of FIG. 4.

Turning now to FIG. 5, shown therein is a block flow diagram summarizing a method for making the components and final assembled torque sensor system 200 of FIG. 4. In the method shown, step 502 involves production of the magnetic field sensors 204 and the electronics components 206 at, for example, "Location A".

Step 504 involves production of the shaft 202 component as described and referenced above at, for example, "Location B".

Step 506, which is optional if digital electronics are available, involves loading a temperature compensation (Tcomp) algorithm into an ECU of the magnetic field sensors 204.

Step 508 involves preferably storing (or retrieving from storage) characteristics information or data for the magnetic field sensors 204 and the electronics components 206 assembly regarding its/their sensitivity, offset, compassing, near field interference, temperature compensation, and/or other parameters.

Step 510 involves providing the characteristics information to, or determining initial or updated characteristics information of the magnetic field sensors 204 and the electronics components 206 assembly at or by, the EOLT of the magnetic field sensors 204 and the electronics components 206 assembly. In this step, the information and data for step 508 is/are created.

Step 512 involves storing or retrieving from storage characteristics information or data for the shaft 202 component regarding its sensitivity, offset, hysteresis, RSU, and/or other parameters.

Step 514 involves providing the characteristics information to, or determining initial or updated characteristics information of the shaft 202 component at or by, the EOLT of the shaft 202 component. In this step, the information and data for step 512 is/are created.

Steps 516 and 518 involve marking (such as by etching), tagging, affixing to, etc., a device or unique identification number to the magnetic field sensors 204 and the electronics components 206 assembly and to the shaft component, respectively. The device may be, for example, a barcode etched to a surface feature of the assembly or component, an RFID chip attached to the assembly or component, a unique identification number marked on the assembly or component for cross-referencing a record in a database or memory of a computer device, or a tag containing written data.

Steps 520 and 522 involve shipping or providing the magnetic field sensors 204 and the electronics components 206 assembly ("Shipment A") and the shaft 202 component ("Shipment B"), along with their characteristics information, to a customer assembly location.

Step 524 involves merging (e.g., through the various processes of positioning, arranging, orienting, connecting, fastening, assembling, attaching, etc.) the shaft 202 component and the magnetic field sensors 204 and the electronics components 206 assembly into a final assembled product by the customer at the customer's assembly location.

Step 526 involves incorporating the final assembled product into another system, such as an automotive transmission by the customer.

Step 528 involves obtaining the previously-determined characteristics information from the device used to store, provide, or transmit the characteristics information for the shaft 202 component and the magnetic field sensors 204 and the electronics components 206 assembly.

Optionally, decision step 530 involves determining whether the temperature compensation (Tcomp) algorithm requires adjustment based on the previously-determined characteristics information for the shaft 202 component and the magnetic field sensors 204 and the electronics components 206 assembly.

If the temperature compensation algorithm requires updating, step 532 involves programming or updating the programming of the electronic control unit for the magnetic field sensors 204 or the system ECU.

If the temperature compensation algorithm does not require updating, step 534 involves programming or updating the programming of the electronic control unit that is used to control the full assembled system (e.g., transmission ECU).

Step 536 involved optionally determining, as necessary, a system level offset after assembly and integration of the assembly into a larger system.

Figure 6:
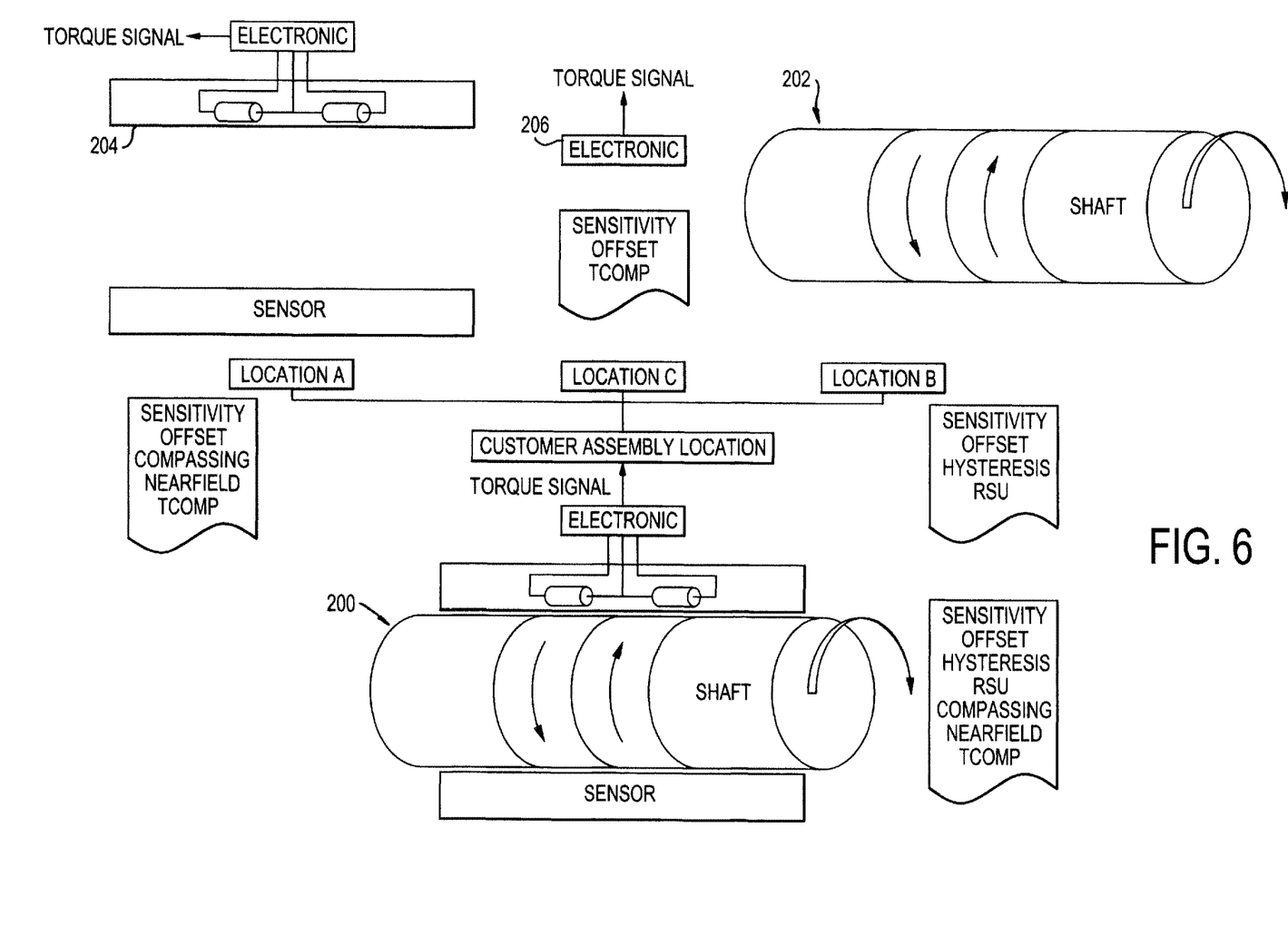
FIG. 6 is a schematic partial cross-sectional diagram of the individual components of and a final assembled torque sensor system, showing a shaft, magnetic field sensors, and electronics components according to another aspect of the present invention.

Turning now to FIG. 6, shown therein is a schematic partial cross-sectional diagram of the individual components of and a final assembled torque sensor system 200, showing a shaft 202, magnetic field sensors 204, and electronics components 206 according to another aspect of the present invention. The magnetic field sensors 204 may be manufactured at a first location (i.e., "Location A") and then shipped to a customer assembly location (i.e., "Shipment A"). The shaft 202 component may be manufactured at a second location (i.e., "Location B") and then shipped to the customer assembly location (i.e., "Shipment B"). The electronics 206 may be manufactured at a third location (i.e., "Location C") and then shipped to the customer assembly location (i.e., "Shipment C"). The three parts may then be combined at the customer's assembly location.

In FIG. 6, the "Location A," the "Location B," and the "Location C" could each be, for example, a different physical location, such as different manufacturing facilities owned by different entities in different states or countries. Or, the "Location A," the "Location B," and the "Location C" could each be a different manufacturing facility owned by the same entity but located at a different physical location, such as in different states or countries. Or, the "Location A," the "Location B," and the "Location C" could each be different manufacturing lines at a particular physical address owned by a single entity. The three locations where the torque sensor system components are made are not be considered as being limited to any particular physical distance separating where they are made, or who or what owns or controls the property at the locations where the components are separately made.

Figure 7:
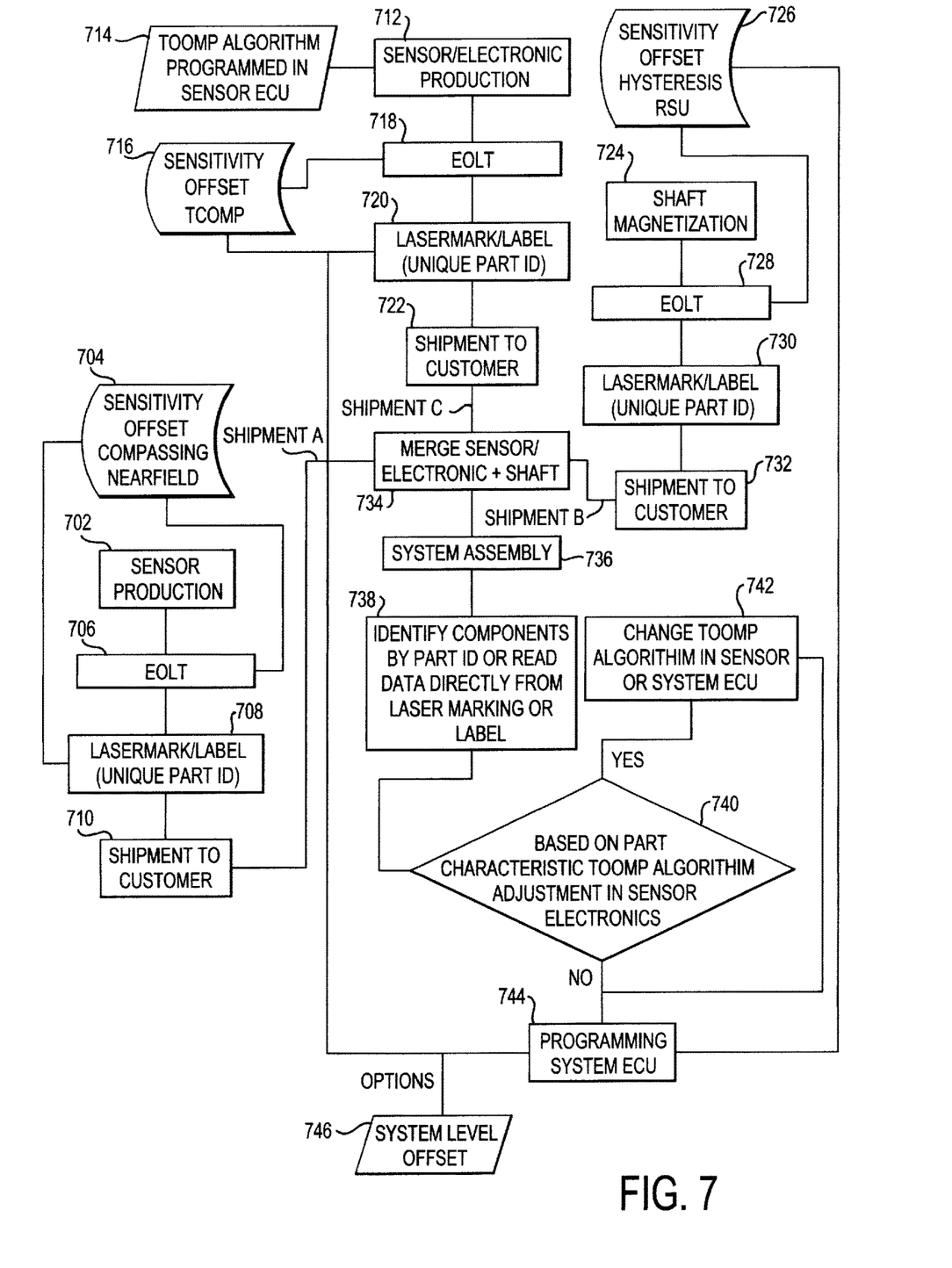
FIG. 7 is a block flow diagram summarizing a method for making the components and final assembled torque sensor system of FIG. 6.

Turning now to FIG. 7, shown therein is a block flow diagram summarizing a method for making the components and final assembled torque sensor system 200 of FIG. 6. In the method, step 702 involves production of the magnetic field sensors 204 at, for example, "Location A," according to the method described and referenced above.

Step 704 involves storing or retrieving from storage characteristics information or data for the magnetic field sensors 204 regarding their sensitivity, offset, compassing, near field interference, and/or other parameters.

Step 706 involves providing the characteristics information to, or determining initial or updated characteristics information of the magnetic field sensors 204 at or by the EOLT of the magnetic field sensors 204. In this step, the information and data for step 704 is/are created.

Step 708 involves marking (such as by etching), tagging, affixing to, etc., a device or unique identification number to the magnetic field sensors 204. The device may be, for example, a barcode etched to a surface feature of the magnetic field sensors 204, an RFID chip attached to the magnetic field sensors 204, a unique identification number marked on the magnetic field sensors 204 for cross-referencing a record in a database or memory of a computer device, or a tag containing written data attached to the magnetic field sensors 204.

Step 710 involves shipping or providing the magnetic field sensors 204 (i.e., "Shipment A"), along with the characteristics information, to a customer assembly location.

Step 712 involves production of the electronics 206 at, for example, "Location C," according to the method referenced above.

Step 714, which is optional if digital electronics are available, involves loading a temperature compensation (Tcomp) algorithm into an electronic control unit (ECU) of the magnetic field sensors 204.

Step 716 involves storing or retrieving from storage characteristics information or data for the electronics 206 regarding their sensitivity, offset, temperature compensation (Tcomp), and/or other parameters.

Step 718 involves providing the characteristics information to or determining initial or updated characteristics information of the electronics 206 at or by the EOLT of the electronics 206. In this step, the information and/or data for step 716 is/are created.

Step 720 involves marking (such as by etching), tagging, affixing to, etc., a device or unique identification number to the electronics 206. The device may be, for example, a barcode etched to a surface feature of the electronics 206, an RFID chip attached to the electronics 206, a unique identification number marked on the electronics 206 for cross-referencing a record in a database or memory of a computer device, or a tag containing written data attached to the electronics 206.

Step 722 involves shipping or providing the electronics 206 (i.e., "Shipment C"), along with the characteristics information, to a customer assembly location.

Step 724 involves production of the shaft 202 at, for example, "Location B") according to the method described and referenced above.

Step 726 involves storing or retrieving from storage characteristics information or data for the shaft 202 regarding its sensitivity, offset, hysteresis, RSU, and/or other parameters.

Step 728 involves providing the characteristics information to or determining initial or updated characteristics information of the shaft 202 at or by the EOLT of the shaft 202. In this step, the information and/or data for step 728 is/are created.

Step 730 involves marking (such as by etching), tagging, affixing to, etc., a device or unique identification number to the shaft 202. The device may be, for example, a barcode etched to a surface feature of the shaft 202, an RFID chip attached to the shaft 202, a unique identification number marked on the shaft 202 for cross-referencing a record in a database or memory of a computer device, or a tag containing written data attached to the shaft 202.

Step 732 involves shipping or providing the shaft 202 (i.e., "Shipment B"), along with the characteristics information, to a customer assembly location.

Step 734 involves merging, at the customer assembly location, the magnetic field sensors 204 produced at "Location A", the electronics 206 produced at "Location C", and the shaft 202 produced at "Location B" into a final assembled product (e.g., through the various processes of positioning, arranging, orienting, connecting, fastening, assembling, attaching, etc.).

Step 736 involves incorporating the final assembled product into another system, such as an automotive transmission.

Step 738 involves obtaining the previously-determined characteristics information from the device used to store, provide, or transmit the characteristics information for the shaft 202, the magnetic field sensors 204, and the electronics 206.

Decision step 740 involves determining whether the temperature compensation (Tcomp) algorithm for the sensor electronics 206 requires adjustment based on the previously-determined characteristics information.

If the temperature compensation algorithm requires updating, step 742 involves programming or updating the programming of the electronic control unit for the magnetic field sensors 204, or the system ECU in the case where only pure analog electronics are available.

If the temperature compensation algorithm does not require updating, step 744 involves programming or updating the programming of the electronic control unit that is used to control the full assembled system (e.g., transmission ECU).

Step 746 involved optionally determining, as necessary, a system level offset after assembly and integration of the assembly into a larger system.

Figure 9:
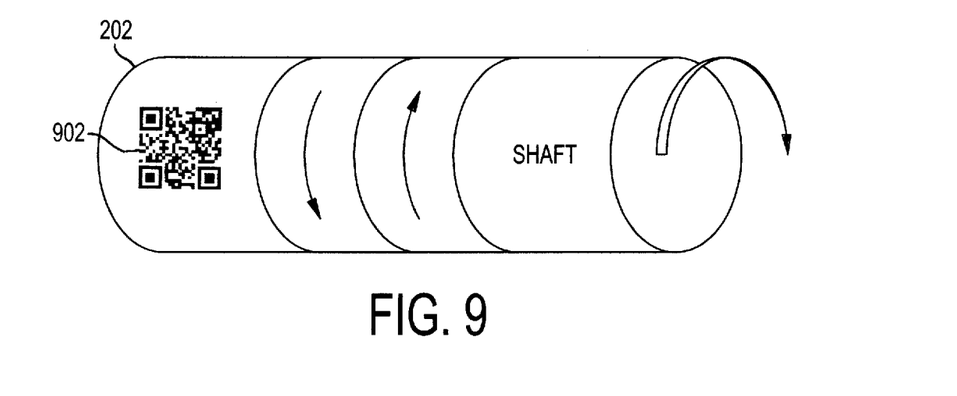
FIG. 9 is a schematic diagram of an individual component of the torque sensor system showing indicia attached to the component containing information.

Turning next to FIG. 9, shown therein is a schematic diagram of a shaft 202 component for use in the torque sensor system 200, where information about the component is provided with the component such as by etching, tagging, affixing to, etc., a device or unique identification number to the shaft 202. As noted above, the device may be, for example, a barcode 902 etched to a surface feature of the shaft 202. A barcode reader (not shown) could be used to scan the barcode 902 to cross reference information stored in a memory device (not shown) that has been previously associated with the component.

As also noted above, instead of a barcode 902, the information about the component may be stored in an RFID chip (not shown) temporarily (and removably) attached to the shaft 202, or a unique identification number (not shown) marked on the shaft 202 for cross-referencing a record in a database or memory of a computer device, or a tag containing written data temporarily (and removably) attached to the shaft 202. The barcode, RFID chip, ID number, or other information storage device or conveying method may also be associated with or included with a package used to transport the component from one location to another.

EXAMPLE

For use in a gearbox torque sensor assembly system or some other application, a shaft having ID No. 506 was paired with a magnetic field sensor having ID No. 105 and a printed circuit board electronics device having ID No. 398.

This pairing of components in a fully assembled system was then referred to as a master system.

Figure 8:
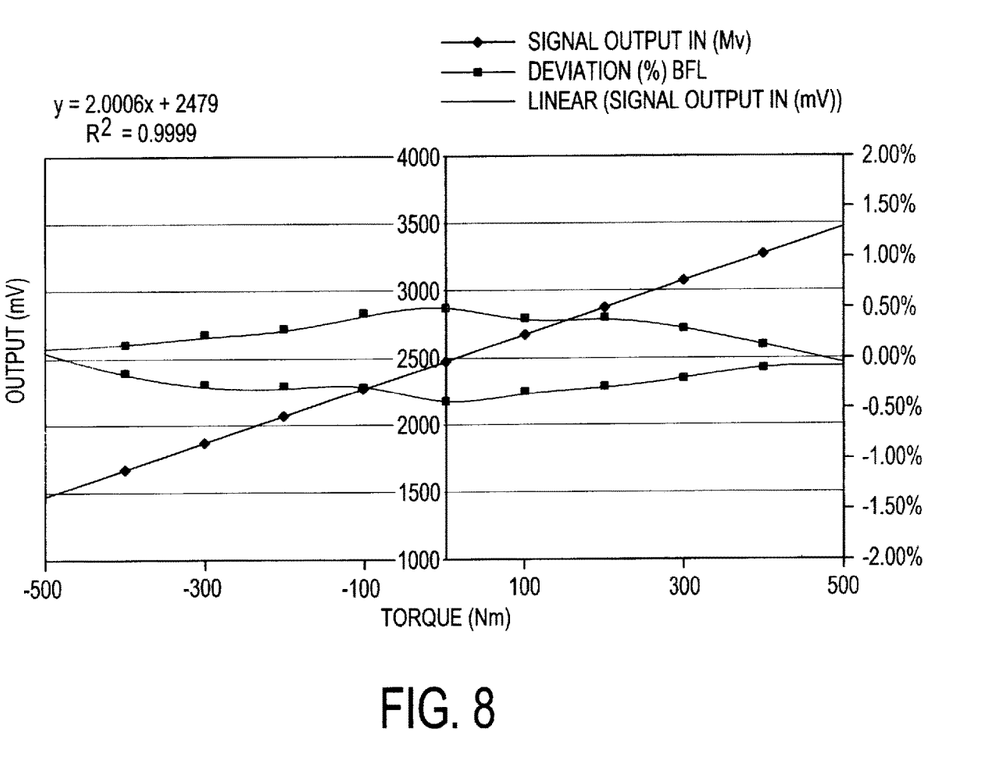
FIG. 8 is a graph showing a calibration output signal from an assembled torque sensor system.

Table 1 provides, and FIG. 8 shows, data reflecting certain characteristics of the master system. In particular, the sensor output signals (mV) was measured relative to varying amounts of applied torque (Nm) to the shaft component. The data in Table 1 and shown in FIG. 8 thus are the calibration results of the master system against which all other combinations of components can be measured (calibrated) against.

As shown in Table 1 and FIG. 8, the offset of the master system (i.e., the electronics output signal at zero applied torque) was determined to be 2,479.0 mV. The gain (i.e., the change in output with applied torque input) was determined to be 2.0006 mV/Nm, with a factor ($R^2$) equal to 0.9999.

TABLE 1

| Measurement Point | Applied Torque (Nm) | Signal Output (mV) | Deviation (%) BFL |
|---|---|---|---|
| 1 | 0 | 2470 | −0.44 |
| 2 | 103 | 2678 | −0.37 |
| 3 | 201 | 2876 | −0.29 |
| 4 | 300 | 3075 | −0.21 |
| 5 | 402 | 3281 | −0.10 |
| 6 | 502 | 3481 | −0.06 |
| 7 | 398 | 3278 | 0.14 |
| 8 | 297 | 3080 | 0.30 |
| 9 | 200 | 2886 | 0.39 |
| 10 | 98 | 2683 | 0.40 |
| 11 | 0 | 2489 | 0.51 |
| 12 | −100 | 2289 | 0.45 |
| 13 | −200 | 2084 | 0.31 |
| 14 | −300 | 1883 | 0.21 |
| 15 | −402 | 1678 | 0.13 |
| 16 | −501 | 1478 | 0.07 |
| 17 | −403 | 1671 | −0.14 |
| 18 | −299 | 1877 | −0.26 |
| 19 | −200 | 2074 | −0.31 |

TABLE 1-continued

| Measurement Point | Applied Torque (Nm) | Signal Output (mV) | Deviation (%) BFL |
|---|---|---|---|
| 20 | −100 | 2273 | −0.29 |
| 21 | 0 | 2470 | −0.44 |

Tables 2(a), 2(b), and 2(c) show measured data (inherent characteristics) for fifteen different assembled pairings of shafts, sensors, and electronics components. Pairing No. 1, shown in the tables, is the master system comprised of the combination of a reference shaft, a reference magnetic field sensor, and a reference electronic component, as described above.

Table 2(a) shows the measured data for the pairing of various shafts (ID Nos. 502, 503, 504, 505, and 507) substituted for the reference shaft (ID No. 506(M)), combined with the reference magnetic field sensor (ID No. 105(M)) and the reference electronic component (ID No. 398(M)).

Table 2(b) shows the measured data for the pairing of various magnetic field sensors (ID Nos. 101, 102, 103, 104, 106) substituted for the reference magnetic field sensors (ID No. 105(M)), combined with the reference shaft (ID No. 506(M)) and the reference electronic component (ID No. 398(M)).

Table 2(c) shows the measured data for the pairing of various electronic components (ID Nos. 399, 401, 403, 404, 405) substituted for the reference electronic component (ID No. 398(M)), combined with the reference shaft (ID No. 506(M)) and the reference magnetic field sensors component (ID No. 105(M)).

In the three tables 2(a), 2(b), and 2(c), the target slope was 2.0 mV/Nm, the target offset was 2,500 mV at zero applied torque, and a general offset adjustment incorporated into the result was 20.987 mV.

TABLE 2(a)

| Assembly No. | Shaft ID | Sensor ID | Electronics ID | Gain (mV/Nm) (1) | Factoring ($R^2$) | Offset (mV) (2) | Offset Adjustment (mV) (3) |
|---|---|---|---|---|---|---|---|
| 1 | 506 (M) | 105 (M) | 398 (M) | 2.0006 | 0.99971 | 2479.013 | 0.00 |
| 2 | 502 | 105 (M) | 398 (M) | 2.0340 | 0.98330 | 2470.263 | 8.749 |
| 3 | 503 | 105 (M) | 398 (M) | 2.0289 | 0.98574 | 2840.340 | −1.328 |
| 4 | 504 | 105 (M) | 398 (M) | 1.9977 | 1.00117 | 2471.673 | 7.340 |
| 5 | 505 | 105 (M) | 398 (M) | 2.0210 | 0.98960 | 2480.449 | −1.436 |
| 6 | 507 | 105 (M) | 398 (M) | 2.0109 | 0.99457 | 2469.583 | 9.430 |

(1) Target slope for torque sensor assembly system is 2.0 mV/Nm.
(2) Reference offset for torque sensor assembly system is 2,500 mV.
(3) Calculated from an actual reference offset of 2,479.013 mV.

TABLE 2(b)

| Assembly No. | Shaft ID | Sensor ID | Electronics ID | Gain (mV/Nm) (1) | Factoring ($R^2$) | Offset (mV) (2) | Offset Adjustment (mV) (3) |
|---|---|---|---|---|---|---|---|
| 1 | 506 (M) | 105 (M) | 398 (M) | 2.0006 | 0.99971 | 2479.013 | 0.00 |
| 2 | 506 (M) | 101 | 398 (M) | 2.0072 | 0.99641 | 2476.559 | 2.453 |
| 3 | 506 (M) | 102 | 398 (M) | 2.0136 | 0.99323 | 2472.893 | 6.120 |
| 4 | 506 (M) | 103 | 398 (M) | 2.0094 | 0.99531 | 2483.848 | −4.835 |
| 5 | 506 (M) | 104 | 398 (M) | 1.9561 | 1.02245 | 2451.617 | 27.396 |
| 6 | 506 (M) | 106 | 398 (M) | 2.0138 | 0.99316 | 2471.111 | 7.902 |

TABLE 2(c)

| Assembly No. | Shaft ID | Sensor ID | Electronics ID | Gain (mV/Nm) (1) | Factoring ($R^2$) | Offset (mV) (2) | Offset Adjustment (mV) (3) |
|---|---|---|---|---|---|---|---|
| 1 | 506 (M) | 105 (M) | 398 (M) | 2.0006 | 0.99971 | 2479.013 | 0.00 |
| 2 | 506 (M) | 105 (M) | 399 | 1.9928 | 1.00361 | 2475.357 | 3.655 |
| 3 | 506 (M) | 105 (M) | 401 | 1.9966 | 1.00171 | 2475.678 | 3.335 |
| 4 | 506 (M) | 105 (M) | 403 | 1.9993 | 1.00034 | 2476.464 | 2.549 |
| 5 | 506 (M) | 105 (M) | 404 | 2.0083 | 0.99586 | 2478.658 | 0.355 |
| 6 | 506 (M) | 105 (M) | 405 | 2.0020 | 0.99899 | 2477.096 | 1.917 |

In practical terms, the master system may be, for example, a fully assembled torque sensor system used by a customer in one of its products, e.g., a gear box for an automobile. When one of the three components needs to be replaced, a new component could be ordered and swapped for the old component. The data in Tables 2(a), 2(b), and 2(c) would be useful in recalibrating the newly paired combination of components by updating software associated with the system.

Table 3 shows the measured data for the pairing of shaft component ID No. 503 with magnetic field sensor component ID No. 102 and electronic component ID No. 401. This pairing of components in a fully assembled torque sensor system was found to exhibit the characteristics as shown, i.e., a gain of 2.0393 mV/Nm with a factor ($R^2$) of 0.9807, and an offset of 2,470.886 mV at zero applied torque, which produces an offset adjustment (relative to the master system) of 8.127 mV. Various other pairings of existing and future-made components, in combination with each other and with the reference components, could be determined in the manner described above, and the results maintained in a database for future reference when customers need to swap components. The database may be accessed directly via a desktop terminal or through a wireless device, such as a barcode scanner with wireless capabilities.

TABLE 3

| Assembly No. | Shaft ID | Sensor ID | Electronics ID | Gain (mV/Nm) | Factoring ($R^2$) | Offset (mV) | Offset Adjustment (mV) |
|---|---|---|---|---|---|---|---|
| 3-3-3 | 503 | 102 | 401 | 2.0393 | 0.9807 | 2470.886 | 8.127 |

I claim:

1. A method for assembling a torque sensor system comprising a rotatable shaft or disk component, a magnetic field sensors component, and an electronics component, the method comprising:
   at a first location, merging the shaft or disk component, the magnetic field sensors component, and the electronics component into a final assembled torque sensor system for use in a second system;
   storing in or retrieving from a storage device characteristics information concerning the final assembled torque sensor system, wherein the characteristics information is based on pre-stored individual characteristics information of or about the rotatable shaft or disk component and pre-stored individual characteristics information of or about the magnetic field sensors component, wherein the pre-stored individual characteristics information are in an electronic storage device attached to the respective shaft, disk, or magnetic field sensors components, provided on a surface of the respective shaft, disk, or magnetic field sensors components, or provided on or in a package used to transport the respective shaft, disk, or magnetic field sensors components to the first location, and wherein the characteristics information concerning the final assembled torque sensor system is one or more of a sensitivity value, an offset hysteresis value, an RSU value, a compassing value, and a near field interference value; and
   shipping or providing the final assembled torque sensor system along with the characteristics information in the storage device to a second location.

2. The method of claim 1, further comprising:
   at the second location different from the first location, incorporating the final assembled toque sensor system into the second system;
   storing in or retrieving from the storage device the characteristics information;
   determining characteristics information of the second system having the final assembled torque sensor system installed; and
   programming or updating a software associated with an electronic control unit used to control the second system using the characteristics information about the final assembled torque sensor system.

3. The method of claim 1, further comprising:
   manufacturing the one or more of the rotatable shaft or disk component, the magnetic field sensors component, and the electronics component at the first location or at one or more separate locations; and
   shipping the manufactured component from each of the one or more separate locations to the first location.

4. The method of claim 1 wherein the characteristics information of or about the one or more shaft or disk component, the magnetic field sensors component, and the electronics component is electronically retrievably stored in an electronic storage device attached to the respective component.

5. The method of claim 1, wherein the characteristics information of or about the one or more shaft or disk component, the magnetic field sensors component, and the electronics component is provided on a surface of the component or on or in a package used to transport the component or the final assembled torque sensor system to the second location.

6. The method of claim 1, wherein the shaft or disk component comprises first and second oppositely circumferentially magnetized sensing regions for outputting respective first and second magnetic fields useful in determining an amount of torque applied to the shaft or disk component.

7. The method of claim 1, wherein the magnetic field sensors component comprises one or more magnetic field sensors arranged proximate to the shaft or disk component for sensing magnetic fields and outputting a signal indicative of a torque applied to the shaft or disk component.

8. The method of claim 1, wherein the electronics component comprises one or more logic circuits for receiving a signal from the magnetic field sensors component indicative of a torque applied to the shaft or disk component and for outputting a second signal.

* * * * *